US008901054B2

(12) United States Patent
Kleinert et al.

(10) Patent No.: US 8,901,054 B2
(45) Date of Patent: Dec. 2, 2014

(54) CELLULOSE AND CELLULOSE ETHER SOLUTIONS AND USE THEREOF

(71) Applicant: SE Tylose GmbH & Co. KG, Wiesbaden (DE)

(72) Inventors: Mike Kleinert, Mainz (DE); Thomas Heinze, Jena (DE); Tim Liebert, Jena (DE); Marc Kostag, Jena (DE)

(73) Assignee: SE Tylose GmbH & Co., KG, Wiesbaden (DE)

(*) Notice: Subject to any disclaimer, the term of this patent is extended or adjusted under 35 U.S.C. 154(b) by 0 days.

(21) Appl. No.: 14/105,423

(22) Filed: Dec. 13, 2013

(65) Prior Publication Data

US 2014/0171352 A1     Jun. 19, 2014

(30) Foreign Application Priority Data

Dec. 18, 2012   (DE) .......................... 10 2012 024 727

(51) Int. Cl.
| | |
|---|---|
| C09D 9/00 | (2006.01) |
| C08L 1/02 | (2006.01) |
| C08L 1/26 | (2006.01) |
| C11D 1/62 | (2006.01) |
| C11D 3/43 | (2006.01) |
| C08J 3/09 | (2006.01) |
| C08B 16/00 | (2006.01) |
| C08J 5/00 | (2006.01) |
| C08B 1/00 | (2006.01) |
| C08B 1/02 | (2006.01) |
| C08B 1/06 | (2006.01) |
| C08B 5/14 | (2006.01) |
| C09D 101/02 | (2006.01) |
| C09D 101/26 | (2006.01) |
| C09D 101/28 | (2006.01) |
| C08L 1/28 | (2006.01) |

(52) U.S. Cl.
CPC ................ C08J 3/096 (2013.01); C08B 16/00 (2013.01); C09D 9/005 (2013.01); C08J 5/00 (2013.01); C09D 9/00 (2013.01); C08L 1/02 (2013.01); C08L 1/26 (2013.01); C08B 1/003 (2013.01); C08B 1/02 (2013.01); C08B 1/06 (2013.01); C08B 5/14 (2013.01); C09D 101/02 (2013.01); C09D 101/26 (2013.01); C09D 101/28 (2013.01); C09D 101/284 (2013.01); C08L 1/284 (2013.01)

USPC .......... 510/174; 510/201; 510/404; 510/471; 510/473; 510/504; 510/505; 106/163.01; 106/200.1

(58) Field of Classification Search
USPC ......... 510/174, 201, 404, 471, 473, 504, 505; 106/163.01, 200.1
See application file for complete search history.

(56) References Cited

U.S. PATENT DOCUMENTS

| | | | |
|---|---|---|---|
| 1,943,176 A | 1/1934 | Graenacher | |
| 3,355,385 A | 11/1967 | Mackley | |
| 4,474,951 A * | 10/1984 | Pope .............................. 536/95 |
| 2010/0305249 A1 | 12/2010 | Buchanan et al. | |
| 2012/0041080 A1 | 2/2012 | Buchanan et al. | |

FOREIGN PATENT DOCUMENTS

| | | |
|---|---|---|
| EP | 0 903 381 A2 | 3/1999 |
| EP | 2 098 539 A1 | 9/2009 |
| GB | 2 151 632 A | 7/1985 |
| KR | 2009 0005423 A | 1/2009 |
| WO | WO 2011/161326 A2 | 12/2011 |

OTHER PUBLICATIONS

S. Köhler et al., "Ammonium-Based Cellulose Solvents Suitable for Homogenous Etherification," *Macromolecular Bioscience* 9 [2009], 836-841.
John Grasvik et al. "Halogen-free ionic liquids and their utilization as cellulose solvents," *Journal of Molecular Structure*, 1028, [2012], 156-163.
Marc Kostag et al. "Efficient Cellulose Solvent: Quaternary Ammonium Chlorides," *Macromoleculor Rapid Communications*, 34, [2013], 1580-1584.

* cited by examiner

*Primary Examiner* — Brian P Mruk
(74) *Attorney, Agent, or Firm* — ProPat, L.L.C.

(57) ABSTRACT

Solutions of cellulose or cellulose ethers in solvent containing triethylheptylammonium chloride, triethyloctylammonium chloride, triethylhexylammonium acetate, triethylheptylammonium acetate, triethyloctylammonium acetate, triethylnonylammonium acetate and/or triethyldecylammonium acetate are provided. The solvent may further include up to 70 wt % of at least one organic solvent, with acetone being the preferred organic solvent. The solution can be formed into a paste for removing paint from wood or metal surfaces. The cellulose (ether) solution can also serve as a reaction medium in which the cellulose and/or the cellulose ether are chemically modified. Finally, the cellulose (ether) solution can be processed into cellulosic shaped articles.

14 Claims, No Drawings

CELLULOSE AND CELLULOSE ETHER SOLUTIONS AND USE THEREOF

CROSS-REFERENCE TO RELATED APPLICATIONS

This application claims priority to German Patent Application 10 2012 024 727.3 filed Dec. 18, 2012, which is hereby incorporated herein by reference in its entirety.

FIELD OF THE INVENTION

The present invention relates to solutions of cellulose in quaternary tetraalkylammonium compounds wherein the solution may additionally comprise further organic solvents. Cellulose in solution can be chemically modified in that, for example, it can be alkylated or acylated and be formed into fibres and other shaped articles by regeneration from the solution.

BACKGROUND OF THE INVENTION

There are only relatively few solvents capable of dissolving cellulose physically (i.e. without intervening chemical derivatization as in the viscose process). They include alkylpyridinium salts (U.S. Pat. No. 1,943,176). However, alkylpyridinium salts generally have a melting point of more than 100° C. Moreover, in the solution, significant degradation of the cellulose chains occurs in that the average degree of polymerization (DP) of the cellulose decreases. This is a disadvantage of this process.

US 2010/0305249 describes homogeneous solutions of cellulose in tetraalkylammonium alkylphosphates. The alkyl groups may be the same or different. They are each preferably straight-chain or branched C1-C5 alkyl groups or C2-C20 alkoxy groups. Tributylmethylammonium dimethylphosphate, tributylethylammonium diethylphosphate, tripropylmethylammonium dimethylphosphate and tripropylethylammonium diethylphosphate are particularly preferred tetraalkylammonium alkylphosphates. The solutions may contain cosolvents in the form of protic or aprotic solvents or ionic liquids (other than the tetraalkylammonium alkylphosphates mentioned), such as hexamethylphosphoramide, N-methylpyrrolidone, nitromethane, N,N-dimethylformamide, N,N-dimethylacetamide, acetonitrile, sulpholane dimethylsulphoxide, aliphatic carboxylic acids, amines or imidazolium salts. The amount of cosolvents is generally from 1 to 15 wt %, based on the total weight of all solvents. The amount of cellulose is generally about 1 to 40 wt %, based on the total weight of the solution. The cellulose can be chemically modified in these solutions in that, for example, it can be converted into cellulose acetate by reaction with acetic anhydride.

The cellulose solutions described in US 2012/0041080 A1 comprise the same tetraalkylammonium alkylphosphates as the solutions described in US 2010/0305249 except that the alkyl groups are straight-chain or branched C1-C5 alkyl groups. Alkoxy groups are not mentioned. The same cosolvents can be used. However the amount of cosolvents is 5 to 90 wt %, based on the total weight of all solvents.

Also known are solutions of cellulose in an ionic liquid where the cation derives from a strong organic base, such as 1,1,3,3-tetramethylguanidine, 1,1,2,3,3-pentamethylguanidine, 1,8-diazabicyclo[5.4.0]undec-7-ene, 1,2-dimethyl-1,4,5,6-tetrahydropyrimidine or iminotris(dimethylamino)phosphorane, and the anion derives from a Brönstedt acid, such as propionic acid, hydrochloric acid, methyl dihydrogenphosphonate or phosphinic acid (WO 2011/161326 A2).

Triethylmethylammonium formate is likewise known to be a useful solvent for cellulose (S. Köhler, T. Liebert, T. Heinze, Ammonium-based Cellulose Solvents Suitable for Homogeneous Etherification, *Macromol. Biosci.* 9 [2009] 836-841). However, in 155° C. it has a relatively high melting point, which is unacceptable for many reactions on cellulose. Adding aqueous formic acid was the only way to adjust the melting point, but greatly limits the possible reactions in this system. Furthermore, derivatizatien of the cellulose occurs during dissolution in that cellulose formate is produced. The maximum cellulose concentration in these solutions is 10 wt %.

Solutions of cellulose in ionic liquids generally display a very high level of viscosity. Moreover, many ionic solvents for cellulose have a relatively high melting point (distinctly above 100° C.). Some degradation of the polymer chains of the cellulose is often observed at the dissolution temperatures needed. Moreover, ionic liquids are relatively costly and have only limited recoverability for reuse. Notably ionic liquids based on heterocycles have a tendency, in homogeneous reactions on the cellulose, to undergo secondary reactions such as ring opening or nucleophilic substitution.

SUMMARY OF ADVANTAGEOUS EMBODIMENTS OF THE INVENTION

The problem addressed by the present invention was accordingly that of providing cellulose solutions in which the cellulose is in a state of homogeneous dissolution at relatively low temperatures (less than 80° C.). The solutions shall be of low viscosity. The cellulose chains shall moreover undergo little if any degradation in the solutions. The solvent shall be recoverable and reusable in the dissolution process. The solvent shall further be inexpensive.

It was found that, surprisingly, cellulose and cellulose ethers form homogeneous solutions into triethylheptylammonium chloride, triethyloctylammonium chloride, triethylhexylammonium acetate, triethylheptylammonium acetate, triethyloctylammonium acetate, triethylnonylammonium acetate and triethyldecylammonium acetate. The hexyl, heptyl, octyl, nonyl and decyl groups therein are each preferably straight-chain.

DETAILED DESCRIPTION OF ADVANTAGEOUS EMBODIMENTS OF THE INVENTION

The present invention accordingly provides a solution of cellulose or a cellulose ether, characterized in that the solvent comprises triethylheptylammonium chloride, triethyloctylammonium chloride, triethylhexylammonium acetate, triethylheptylammonium acetate, triethyloctylammonium acetate, triethylnonylammonium acetate and/or triethyldecylammonium acetate.

In one preferred embodiment, the triethylheptylammonium chloride, triethyloctylammonium chloride, triethylhexylammonium acetate, triethylheptylammonium acetate, triethyloctylammonium acetate, triethylnonylammonium acetate and/or triethyldecylammonium acetate is in an admixture with an organic solvent. The amount of the organic solvent up to 70 wt %, based on the total weight of the solvent mixture. The mixtures of quaternary ammonium salt and organic solvent have a distinctly lowered melting point compared with the pure quaternary ammonium salt. Mixtures of this type can even be used to produce cellulose solutions that are liquid at room temperature. The amount of cellulose dissolved in the solvent mixture can be up to 2.5 wt %, based on the total weight of the solution. This is distinctly more than is present, for example, in viscose solution (about 7 to 8 wt %).

The organic solvent is preferably a ketone (such as acetone, ethyl methyl ketone, tert-butyl methyl ketone, acetylacetone, acetophenone or cyclopentanone), an ether (for example a dialkyl ether, where the two alkyl groups may be the same or different, or tetrahydrofuran), an amide (such as N,N-dimethylacetamide, N,N-dimethylformamide or N-methyl-2-pyrrolidone), a sulphoxide (such as dimethyl sulphoxide) or a heteroaromatic (such as pyridine). A mixture of the solvents mentioned can also be used. Acetone has surprisingly proved to be a particularly suitable solvent. The amount of organic solvent is preferably 20 to 65 wt %, more preferably 30 to 60 wt %, each based on the total weight of all solvents. When the amount of acetone in the solvent mixture is raised to above 70 wt %, the cellulose is precipitated. This effect can be exploited in a spinning process to solidify cellulose fibres by passing the extrudate into a coagulation bath filled with acetone. The particular advantage of such a procedure is that no further solvents are needed. This greatly facilitates recovery of the quaternary ammonium salts.

Preferably, in addition to quaternary ammonium salt and one or more of the organic solvents mentioned, the cellulose (ether) solution of the present invention contains no further solvents.

The cellulose is a microcrystalline cellulose, for example. It is also possible to use wood pulp or cotton linters. The average degree of polymerization (DP) of the cellulose is preferably in the range from 300 to 2900 and more preferably in the range from 500 to 1200.

The cellulose ether solution of the present invention preferably contains nonionic cellulose ethers, such as hydroxyethylcellulose (HEC), methylhydroxyethylcellulose (MHEC), hydroxypropylcellulose (HPC) or methylhydroxypropylcellulose (MHPC). In methylhydroxyethylcelluloses and methylhydroxypropylcelluloses, the DS(Me) is generally in the range from 1.0 to 2.5, preferably in the range from 1.2 to 2.5 and more preferably in the range from 1.4 to 1.9, and the MS (HE or HP) is generally in the range from 0.01 to 1.0, preferably in the range from 0.05 to 0.8 and more preferably in the range from 0.05 to 0.6. In hydroxyethylcelluloses and hydroxypropylcelluloses, the MS (HE or HP) is generally in the range from 1.0 to 4.0 and preferably in the range from 1.5 to 3.3.

The invention further provides a method of preparing the cellulose or cellulose ether solution. It advantageously comprises first adding the cellulose to the solvent mixture, then heating the mixture until the cellulose or cellulose ether has dissolved and subsequently cooling the mixture back down, where necessary. The solution has prolonged shelf life.

The cellulose/cellulose ether solution can be used as such, for example as paste for removing paint layers from wood, metal, etc.

The solution can also serve as a reaction medium wherein the cellulose or cellulose ether is chemically changed, for example etherified or esterified.

Finally, the cellulose solution can also be processed into shaped cellulose articles, for example into cellulose fibres or self-supporting cellulose film/sheet. Forming is by extrusion, for example. In an extrusion process, the extrudate passes into a coagulation bath where the cellulose precipitates. In the coagulation bath, for example, the acetone content of the extrudate can be raised to such an extent that the cellulose comes out of solution. The process then corresponds to the familiar local process.

The examples which follow illustrate the invention. Percentages are by weight unless otherwise stated or directly apparent from the context. The cellulose used in the examples was vacuum dried at 100° C. for 2 hours. Triethylamine and acetonitrile were purified and dried by standard methods. The hydroxide-loaded strongly basic ion exchange resin (SGA550OH from Purolite) was repeatedly washed with methanol before use.

Methods of Measurement:

NMR spectra were recorded by dissolving the samples in $CDCl_3$ and measuring in a Bruker Avance 250 and 400 MHz spectrometer (16 scans each for $^1H$ NMR spectra) or in a 63 or 101 MHz spectrometer with up to 1024 scans for $^{13}C$ NMR spectra.

Elemental analyses were carried out with a CHNS 932 analyzer (Leco). Strongly hygroscopic samples were measured in perchlorate form.

The melting points of the tetraalkylammonium chloride or bromide salts mentioned were determined by a standard method. The samples were introduced into a small glass tube and dried in a desiccator over phosphorus pentoxide under reduced pressure for 24 hours. The glass tubes were then sealed and the melting points determined in a Büchi Melting Point B-545.

Syntheses under microwave irradiation were carried out with a CEM Mars 5 using an open or closed reaction vessel. The reaction mixture was heated to the chosen temperature over a period of 15 min and maintained at this temperature for the desired reaction time while microwaves were applied at a power output of 200 W.

Viscosity determinations on the solvents and polymer solutions (1 wt % solutions) were performed with a Haake-Mars II cone-plate rheometer at 20° C. Shear rates were varied from 1 to 1000 $s^{-1}$. Each individual measurement was performed in a cycle of increasing and decreasing shear rate for 5 minutes to ensure reproducibility and verify the absence of thixotropy. To prevent the absorption of moisture, a thin film or low-viscosity silicone oil ($\eta_{20}$° C.=9.5 mPa s) was placed around the rim of the measuring cell in addition to a nitrogen-inertized solvent trap being used.

EXAMPLE 1

Synthesis of Triethyloctylammonium Bromide ($TEC_8Br$)—Typical Method

Method A:

A 100 ml flask was purged with nitrogen before 8.84 g (0.087 mol) of triethylamine, 20.33 g (0.105 mol) of 1-bromoctane and 31.04 g of acetonitrile were introduced into the flask. The mixture was stirred under protective nitrogen gas at 80° C. for 48 hours. Volatiles were then drawn off under reduced pressure. The crude product was crystallized from an ethyl acetate/acetone mixture to obtain 18.55 g (0.063 mol) of triethyloctylammonium bromide (white hygroscopic crystals). The yield was 72%, based on triethylamine.

Method B:

A nitrogen-purged 500 ml flask was charged with 21.84 g (0.216 mol) of triethylamine, 49.85 g (0.258 mol) of 1-bromoctane and 74.60 g of acetonitrile. The mixture was heated to 80° C. in a microwave oven for a period of 15 minutes and then stirred at 80° C. at a microwave power output of 200 W for a further 6 hours. The volatile constituents of the reaction mixture were then drawn off under reduced pressure and the residue was crystallized from a mixture of ethyl acetate/acetone. This contained 55.60 g (0.190 mol) of triethyloctylammonium bromide. The yield was 88%, based on triethylamine.

$^1$H NMR (300 MHz; CDCl$_3$ as solvent; -scale; t=triplet, q=quadruplet, m=multiplet): 3.53 (q, 6H, ethyl-NCH$_2$—), 3.29 (t, 2H, octyl-NCH$_2$—), 1.39 (t, 9H, ethyl-CH$_3$), 1.27 (m, 10H, octyl-CH$_2$—), 0.88 (t, 3H, octyl-CH$_3$);

$^{13}$C NMR (62.5 MHz; CDCl$_3$ as solvent; -scale): 57.5 (C1), 53.5 (C1'), 31.6 (C6), 29.1, 29.0 (C4, C5), 26.5 (C3), 22.6 (C7), 22.1 (C2), 14.1 (C8), 8.1 (C2').

Elemental Analysis:

calculated for C$_{14}$H$_{32}$ClNO$_4$: C, 53.57%; H, 10.28%; N, 4.46%. found: C, 53.76%; H, 10.14%; N, 4.33%. Melting point: 107° C.

Synthesis of Triethyloctylammonium Chloride (TEC$_8$Cl)—Typical Method

Method A:

A nitrogen-purged 500 ml flask was charged with 28.96 g (0.286 mol) of triethylamine, 55.23 g (0.371 mol) of 1-chlorooctane and 78.11 g of acetonitrile. The mixture was stirred at 80° C. under nitrogen for 96 hours. The volatile constituents of the reaction mixture were then drawn off under reduced pressure and the residue was washed with heptane and ethyl acetate to obtain 10.34 g (0.069 mol) of triethyloctylammonium chloride (white hygroscopic salt). The yield was 24%, based on triethylamine.

Triethylpropylammonium chloride to triethylheptylammonium chloride TEC$_5$Cl, TEC$_6$Cl and TEC$_7$Cl) were prepared in a similar manner.

Method B:

A stainless-steel autoclave fitted with magnetic stirrer and manometer was purged with nitrogen and then charged with 36.13 g (0.357 mol) of triethylamine, 46.28 g (0.311 mol) of 1-chlorooctane and 81.40 g of acetonitrile. The autoclave was sealed and pressurized with 25 bar of nitrogen. The mixture in the autoclave was then heated to 80° C. and stirred for 48 hours. Thereafter, the superatmospheric pressure was released and the volatile constituents of the reaction mixture were drawn off under reduced pressure. The crude product was subsequently washed with heptane and ethyl acetate to obtain 8.30 g (0.033 mol) of triethyloctylammonium chloride (white hygroscopic salt). The yield was 11% based on 1-chlorooctane.

Method C:

A solution of 14.11 g (0.048 mol) of triethyloctylammonium bromide in 480 ml of methanol (=0.1 molar solution) was applied to an ion exchange column packed with a strong basic anion exchange resin, and eluted with methanol. The eluate was neutralized with dilute hydrochloric acid and the solvent was drawn off to leave 11.92 g (0.048 mol) of triethyloctylammonium chloride (white hygroscopic salt). The yield was 99%.

$^1$H NMR (250 MHz; CDCl$_3$ as solvent; -scale): 3.48 (q, 6H, ethyl-N—CH$_2$—), 3.22 (t, 2H, octyl-N—CH$_2$—), 1.68 (m, 2H, octyl-CH$_2$—), 1.38 (t, 9H, ethyl-CH$_3$), 1.26 (m, 10H, octyl-CH$_2$—), 0.68 (t, 3H, octyl-CH$_3$);

$^{13}$C NMR (62.5 MHz; CDCl$_3$ as solvent; -scale): 57.4 (C1), 53.4 (C1'), 31.6 (C6), 29.1, 29.0 (C4, C5), 25.6 (C3), 22.5 (C7), 22.0 (C2), 14.0 (C8), 8.0 (C2').

Elemental Analysis:

calculated for C$_{14}$H$_{32}$ClNO$_4$: C, 53.57%; H, 10.28%; N, 4.46%. found: C, 53.47%; H, 10.31%; N, 4.44%. Melting point: 81° C.

Synthesis of Triethyloctylammonium Acetate (TEC$_8$Ac)—Typical Method

A solution of 29.35 g (0.1 mol) of triethyloctylammonium bromide in 1 l methanol (=0.1 molar solution) was applied to an ion exchange column packed with a strong basic anion exchange resin, and eluted with methanol. The eluate was neutralized with acetic acid and the solvent was drawn off to leave 26.60 g (0.097 mol) of triethyloctylammonium acetate (yellow hygroscopic liquid). The yield was 97%.

$^1$H NMR (250 MHz; CDCl$_3$ as solvent; -scale): 3.34 (q, 6H, ethyl-N—CH$_2$—), 3.11 (t; 2H, octyl-N—CH$_2$—) 1.86 (s, 3H, acetat-CH$_3$—), 1.56 (m, 2H, octyl-CH$_2$—), 1.25 (t, 9H, ethyl-CH$_3$), 1.17 (m, 10H, octyl-CH$_2$—), 0.77 (t, 3H, octyl-CH$_3$);

$^{13}$C NMR (62.5 MHz; CDCl$_3$ as solvent; -scale): 175.0 (C=O), 57.1 (C1), 53.0 (C1'), 31.5 (C6), 29.0, 28.9 (C4, C5), 26.3 (C3), 24.1 (C7), 22.4 (C2), 21.3 (acetat-CH$_3$), 13.9 (C8), 7.6 (C2').

Elemental Analysis:

calculated for C$_{14}$H$_{32}$ClNO$_4$: C, 53.57%; H, 10.28%; N, 4.46%. found: C, 53.50%; H, 10.33%; N, 4.41%. Melting point: liquid at room temperature The melting points of further triethylalkylammonium chlorides and bromides, the melting point of trimethyloctylammonium chloride (TMC$_8$Cl), of tripropyloctylammonium chloride and bromide (TMC$_8$Cl and TMC$_8$Br, respectively) and of tributyloctylammonium chloride and bromide (TBC$_8$Cl and TBC$_8$Br, respectively) and also the solubility of cellulose, hydroxyethylcellulose (HEC; MS(HE)=1.97; H27NG4 from SE Tylose GmbH) and hydroxypropylcellulose (HPC; MS(HP)=1.16) in the salts in wt %, based on the total weight of the solution, are presented below in table 1:

TABLE 1

| Salt | Melting Point [° C.] | Solubility)$^1$ of cellulose [wt %] | Solubility)$^1$ of HEC [wt %] | Solubility)$^1$ of HPC [wt %] |
|---|---|---|---|---|
| TEC$_3$Cl | 275 )$^2$ | — | — | — |
| TEC$_4$Cl | 211 )$^2$ | — | — | — |
| TEC$_5$Cl | 141 | — | — | — |
| TEC$_6$Cl | 103 | — | — | — |
| TEC$_7$Cl | 98 | 10 | 7.5 | 7.5 |
| TEC$_8$Cl | 81 | 15 | 10 | 10 |
| TEC$_9$Cl | —)$^3$ | — | — | — |
| TEC$_{10}$Cl | 65 | — | — | — |
| TEC$_{12}$Cl | 115 | — | — | — |
| TEC$_{14}$Cl | —)$^3$ | — | — | — |
| TEC$_{16}$Cl | —)$^3$ | — | — | — |
| TEC$_6$Br | 104 | — | — | — |
| TEC$_7$Br | 109 | — | — | — |
| TEC$_8$Br | 107 | — | — | — |
| TEC$_9$Br | 105 | — | — | — |
| TEC$_{10}$Br | 106 | — | — | — |
| TEC$_{12}$Br | 84 | — | — | — |
| TMC$_8$Cl | —)$^3$ | — | — | — |
| TPC$_8$Cl | RT )$^4$ | — | — | — |
| TPC$_8$Br | RT | — | — | — |
| TBC$_8$Cl | RT | — | — | — |
| TBC$_8$Br | RT | — | — | — |
| TEC$_6$Ac | RT | 7.5 | — | — |
| TEC$_7$Ac | RT | 7.5 | — | — |
| TEC$_8$Ac | RT | 7.5 | — | — |
| TEC$_9$Ac | RT | 7.5 | — | — |
| TEC$_{10}$Ac | RT | 7.5 | — | — |

)$^1$— is to be understood as meaning: cellulose, HEC or HPC, as applicable, dissolves to less than 1 wt %, if at all
)$^2$ decomposition
)$^3$ not determinable
)$^4$ RT = room temperature (21° C.), i.e. salt is liquid at RT

EXAMPLE 2

Preparing a Cellulose Solution Without Adding an Organic Solvent—Typical Method

In a 50 ml flask which had been purged with nitrogen, 4.5 g of TEC$_8$Cl were heated to 120° C. The melt was admixed with 0.5 g of cellulose and mechanically stirred at this temperature for 30 minutes to obtain to translucent solution.

EXAMPLE 3

Preparing a Cellulose Solution with an Added Organic Solvent—Typical Method

Method A:

A nitrogen-purged 50 ml flask was charged with 5.10 g of TEC$_8$Cl 0.56 g of cellulose and 1.86 g of N,N-dimethylacetamide. The mixture was mechanically stirred at 60° C. for 2 hours to obtain a clear solution.

Method B:

A nitrogen-purged 50 ml flask was charged with 4.5 g of TEC$_8$Cl, 0.5 g of cellulose and 5 g of acetone. The mixture was mechanically stirred at 60° C. for 3 hours to obtain a translucent solution.

EXAMPLE 4

Preparing a Cellulose Ether Solution with an Added Organic Solvent—Typical method A nitrogen-purged 50 ml flask Was charged with 2.27 g of TEC$_8$ Cl, 0.11 g of hydroxyethylcellulose (MS(HE)=1.97; H27NG4 from SE Tylose GmbH) and 2.51 g of acetone. The mixture was mechanically stirred at 50° C. for 3 hours to obtain a clear solution.

EXAMPLE 5

Regeneration of Cellulose from a Cellulose Solution with an Added Organic Solvent—Typical Method Acetone is gradually added dropwise to a solution obtained as in Method B of Example 3 and temperature regulated to 60° C. After 7.5 g of acetone have been added, cellulose starts to precipitate. Precipitation is complete on addition of altogether 20 g of acetone. By subsequently removing 20 g of acetone under reduced pressure it is again possible to obtain a translucent cellulose solution.

Table 2 given below lists the viscosity of various solvents and solvent mixtures and also the viscosity of 1 wt % solutions of cellulose/hydroxyethylcellulose in these solvents/solvent mixtures at a measurement temperature of 20° C.

TABLE 2

| | Weight ratio | Shear rate $\dot{\gamma}$ ([s$^{-1}$]) | Viscosity η [mPa s] |
|---|---|---|---|
| Acetone | — | 400-1000 | 0.3 |
| TEC$_8$Cl/acetone | 4.5/5 | 116.9 | 11.7 |
| TEC$_8$Cl/acetone | 4.5/5 | 116.9 | 10.3 |
| AVICEL ®/acetone)[1] | 1/99 | 400-1000 | 0.4 |
| AVICEL ®/TEC$_8$Cl/acetone | 1/46.9/52.1 | 112.4 | 102.6 |
| AVICEL ®/TEC$_8$Cl/acetone | 1/46.9/52.1 | 112.4 | 90.6 |
| HEC/acetone)[1] | 1/99 | 112.4 | 42.8 |
| HEC/TEC$_8$Cl/acetone | 1/46.9/52.1 | 112.4 | 329.2 |
| HEC/TEC$_8$Cl/acetone | 1/46.9/52.1 | 112.4 | 372.9 |
| HEC/TEC$_8$Cl/acetone | 1/46.9/52.1 | 112.3 | 361.9 |
| HEC/TEC$_8$Cl/acetone | 1/46.9/52.1 | 112.4 | 395.7 |

)[1]these are suspensions
AVICEL ®: is AVICEL ® PH-101 microcrystalline cellulose from FMC BioPolymer, Philadelphia, USA
HEC: Hydroxyethylcellulose 11003/046 from SE Tylose GmbH & Co. KG (MS(HE): 1.09)
TEC$_8$Cl: triethyloctylammonium chloride

EXAMPLE 6

Synthesis of Tosylcellulose in Triethyloctylammonium Chloride

In a 50 ml flask which had been purged with nitrogen, 2.01 g of TEC$_8$Cl were heated to 120° C. The melt was admixed with 0.25 g of cellulose and mechanically stirred at this temperature for 30 minutes to obtain a translucent solution. After cooling down to room temperature, 0.75 g of 4-toluenesulphonyl chloride in 1.3 ml of pyridine was gradually added dropwise and stirred in at room temperature for 24 hours. The reaction solution was precipitated in 200 ml of ice-water. The precipitate was washed three times with 100 ml of water and 100 ml of ethanol and then reprecipitated from dimethyl sulphoxide/isopropanol. Three days of drying at 60° C. under reduced pressure left 0.37 g of tosylcellulose (98%, DS$_S$=0.5, DS$_{Cl}$=0.2).

Elemental Analysis:
found: C, 46.58%; H, 4.91%; N, 0.00%; S, 6.63%; Cl, 3.22%.

That which is claimed:

1. A solution comprising cellulose or cellulose ether in solvent, said solvent comprising quaternary ammonium salt selected from triethylheptylammonium chloride, triethyloctylammonium chloride, triethylhexylammonium acetate, triethylheptylammonium acetate, triethyloctylammonium acetate, triethylnonylammonium acetate and/or triethyldecylammonium acetate, wherein said quaternary ammonium salt is at least 30% by weight, relative to the total weight of the solvent.

2. A solution according to claim 1, wherein the solvent comprises a mixture of a) triethylheptylammonium chloride, triethyloctylammonium chloride, triethylhexylammonium acetate, triethylheptylammonium acetate, triethyloctylammonium acetate, triethylnonylammonium acetate and/or triethyldecylammonium acetate and b) at least one organic solvent, said organic solvent present in an amount of up to 70 wt %, based on the total weight of the solvent mixture.

3. A solution according to claim 2, wherein the organic solvent is a ketone, an ether, an amide, a sulphoxide or a heteroaromatic.

4. A solution according to claim 2, wherein the organic solvent is acetone.

5. A solution comprising cellulose or cellulose ether in solvent, said solvent comprising a mixture of triethylheptylammonium chloride, triethyloctylammonium chloride, triethylhexylammonium acetate, triethylheptylammonium acetate, triethyloctylammonium acetate, triethylnonylammonium acetate and/or triethyldecylammonium acetate and b) at least one organic solvent, wherein the proportion of the at least one organic solvent is 20 to 65 wt %, based on the total weight of all solvents.

6. A solution according to claim 2, wherein the proportion of the at least one organic solvent is 30 to 60 wt %, based on the total weight of all solvents.

7. A solution according to claim 1, wherein the cellulose ether is a nonionic cellulose ether.

8. A solution according to claim 1, wherein the cellulose ether is hydroxyethylcellulose (HEC), methylhydroxyethylcellulose (MHEC), hydroxypropylcellulose (HPC) or methylhydroxypropylcellulose (MHPC).

9. Paint remover comprising a solution of cellulose or cellulose ether in solvent, said solvent comprising triethylheptylammonium chloride, triethyloctylammonium chloride, triethylhexylammonium acetate, triethylheptylammonium acetate, triethyloctylammonium acetate, triethylnonylammonium acetate and/or triethyldecylammonium acetate, said paint remover in paste form, said paint remover removing paint layers from wood, metal or other substrates.

10. A reaction medium comprising the solution of cellulose or cellulose ether according to claim 1, wherein the cellulose or cellulose ether is chemically changed.

11. A reaction medium comprising the solution of cellulose or cellulose ether according to claim 1, wherein the cellulose or cellulose ether is etherified and/or esterified.

12. A method of making shaped cellulose articles comprising coagulating the solution of cellulose or cellulose ether according to claim 1.

13. A method of making shaped cellulose articles as claimed in claim 12, wherein said coagulating step further comprises providing an excess of organic solvent.

14. A solution according to claim 1, wherein the solvent consists of a mixture of quaternary ammonium salt(s) and at least one organic solvent selected from ketone, ether, amide, sulphoxide or heteroaromatic.

* * * * *